(12) United States Patent
Yaluris et al.

(10) Patent No.: US 7,695,611 B2
(45) Date of Patent: Apr. 13, 2010

(54) REDUCTION OF NO$_x$ EMISSIONS IN FULL BURN FCC PROCESSES

(75) Inventors: George Yaluris, Park Ridge, IL (US); John Rudesill, Columbia, MD (US)

(73) Assignee: W. R. Grace & Co.—Conn., Columbia, MD (US)

( * ) Notice: Subject to any disclaimer, the term of this patent is extended or adjusted under 35 U.S.C. 154(b) by 327 days.

(21) Appl. No.: 11/665,814

(22) PCT Filed: Oct. 31, 2005

(86) PCT No.: PCT/US2005/039093

§ 371 (c)(1), (2), (4) Date: Apr. 19, 2007

(87) PCT Pub. No.: WO2006/050168

PCT Pub. Date: May 11, 2006

(65) Prior Publication Data

US 2009/0045101 A1    Feb. 19, 2009

Related U.S. Application Data

(60) Provisional application No. 60/424,492, filed on Nov. 2, 2004.

(51) Int. Cl.
*C10G 11/04* (2006.01)

(52) U.S. Cl. .................. 208/121; 502/302; 502/303; 502/304; 502/305; 502/309; 502/312; 502/314; 502/318; 502/319; 502/320; 502/326; 502/327; 502/328; 502/330; 502/331; 502/333; 502/339

(58) Field of Classification Search ......... 502/300–339; 208/121

See application file for complete search history.

(56) References Cited

U.S. PATENT DOCUMENTS

| | | | |
|---|---|---|---|
| 4,153,535 A | 5/1979 | Vasalos et al. | 208/120 |
| 4,290,878 A | 9/1981 | Blanton, Jr. | 208/120 |
| 4,300,997 A | 11/1981 | Meguerian et al. | 502/42 |
| 4,626,419 A | 12/1986 | Lewis et al. | 423/244 |
| 4,973,399 A | 11/1990 | Green et al. | 208/120 |
| 5,002,654 A | 3/1991 | Chin | 208/121 |
| 5,037,538 A | 8/1991 | Chin et al. | 208/113 |
| 5,242,881 A | 9/1993 | Tang | 502/244 |
| 5,364,517 A | 11/1994 | Dieckmann et al. | 208/121 |
| 5,382,352 A | 1/1995 | Hansen et al. | 208/121 |
| 5,443,807 A | 8/1995 | Tang | 423/247 |
| 5,492,878 A | 2/1996 | Fujii et al. | 502/304 |
| 5,547,648 A | 8/1996 | Buchanan et al. | 423/210 |
| 5,565,181 A | 10/1996 | Dieckmann et al. | 423/239.1 |
| 6,129,834 A | 10/2000 | Peters et al. | 208/120.01 |
| 6,143,167 A | 11/2000 | Peters et al. | 208/113 |
| 6,165,933 A | 12/2000 | Peters et al. | 502/330 |
| 6,280,607 B1 | 8/2001 | Peters et al. | 208/120.01 |
| 6,358,881 B1 | 3/2002 | Peters et al. | 502/304 |
| 6,660,683 B1 * | 12/2003 | Yaluris et al. | 502/241 |
| 2004/0074809 A1 | 4/2004 | Yaluris et al. | 208/113 |
| 2005/0148463 A1 * | 7/2005 | Jen et al. | 502/325 |

FOREIGN PATENT DOCUMENTS

| | | |
|---|---|---|
| WO | 95/03876 | 2/1995 |
| WO | 96/34685 | 11/1996 |
| WO | 97/48480 | 12/1997 |

OTHER PUBLICATIONS

Rosser, F.S. et al. (2004) Integrated View to Understanding the FCC NO$_x$ Puzzle, 2004 AIChE Annual Meeting, 20 pgs.*
G. W. Young, G.D. Weatherbee, and S.W. Davey, "Simulating Commercial FCCU Yields With The Davison Circulating Riser (DCR) Pilot Plant Unit," National Petroleum Refiners Association (NPRA) Paper AM88-52.
J.S. Magee and M.M. Mitchell, Jr. Eds. Studies in Surface Science and Catalysis vol. 76; Ch 8, pp. 257-292, Elsevier Science Pulbishers B.V., Amsterdam 1993, ISBN 0-444-89037-8; G.W. Young, "Realistic Assessment of FCC Catalyst Performance in the Laboratory," in Fluid Catalytic Cracking: Science and Technology.
Corma, et al., "Simultaneous Catalytic Removal of Sox and Nox with Hydrotalcite-Derived Mixed Oxides Containing Copper, and Their Possibilities to be Used in FCC Units," Journal of Catalysis, 170,140 (1997).
Venuto and Habib, Fluid Catalytic Cracking with Zeolite Catalyts , Marcel Dekker, New York 1979, ISBN 0-8247-6870-1.
Sadeghbeigi, Fluid Catalytic Cracking Handbook, Gulf Publ. Co. Houston, 1995, ISBN 0-88415-290-1.
Scherzer, "Ocatane Enhancing Zeolite FCC Catalysts", Marcel Dekker, New York, 1990 ISBN 0-8247-8399-9.
G. Yaluris and A.W. Peters "Studying the Chemistry of the FCCU Regenerator in the Laboratory Under Realistic Conditions," Designing Transportation Fuels for a Cleaner Environment, J.G. Reynolds and M.R. Khan, eds., p. 151, Taylor & Francis, 1999, ISBN: 1-56032-813-4.

* cited by examiner

*Primary Examiner*—Robert J Hill, Jr.
*Assistant Examiner*—Brian McCaig
(74) *Attorney, Agent, or Firm*—Charles A. Cross; Beverly J. Artale (57) ABSTRACT

Compositions for reduction of NO$_x$ emissions generated during catalytic cracking process, preferably, a fluid catalytic cracking process, are disclosed. The compositions comprise (i) an acidic metal oxide containing substantially no zeolite, (ii) an alkali metal, alkaline earth metal, and mixtures thereof, (iii) an oxygen storage component, (iv) palladium and (v) a noble metal component, preferably platinum, rhodium or iridium, and mixtures thereof. Preferably, the compositions are used as separate additives particles circulated along with the circulating FCC catalyst inventory. Reduced content of NO$_x$ in an effluent off gas of a full or complete combustion FCC regenerator are accomplished while simultaneously promoting the combustion of CO.

10 Claims, 4 Drawing Sheets

Figure 1
Effectiveness of Additives A and C for reducing NO emissions by reacting it with CO in the RTU Figure 2
NH$_3$ conversion in the RTU when NH$_3$ reacts with NO and various levels of O$_2$ in the reactor feed in the presence of the Additives B and C.

Figure 3

NO conversion in the RTU when $NH_3$ reacts with NO and various levels of $O_2$ in the reactor feed in the presence of Additives B and C. Negative NO conversions indicate net formation of NO from $NH_3$ oxidation.

Figure 4
NO emissions measured in the DCR regenerator effluent during testing of Additives A and C.

REDUCTION OF $NO_x$ EMISSIONS IN FULL BURN FCC PROCESSES

FIELD OF THE INVENTION

The present invention relates to a process for the reduction of $NO_x$ emissions in refinery processes, and specifically in a fluid catalytic cracking (FCC) process. Particularly, the present invention relates to a process for the reduction of $NO_x$ in the off gas emitted from a fluid catalytic cracking unit (FCCU) regenerator operating in a full burn or complete combustion mode.

BACKGROUND OF THE INVENTION

In recent years, there has been an increased concern in the United States and elsewhere about air pollution from industrial emissions of noxious oxides of nitrogen, sulfur and carbon. In response to such concerns, government agencies have placed limits on allowable emissions of one or more of the pollutants, and the trend is clearly in the direction of increasingly stringent restrictions.

$NO_x$, or oxides of nitrogen, in flue gas streams exiting from fluid catalytic cracking (FCC) regenerators is a pervasive problem. Fluid catalytic cracking units (FCCUs) process heavy hydrocarbon feeds containing nitrogen compounds a portion of which is contained in the coke on the catalyst as it enters the regenerator. Some of this coke nitrogen is eventually converted into $NO_x$ emissions, either in the FCC regenerator or in a downstream CO boiler. Thus all FCCUs processing nitrogen-containing feeds can have a $NO_x$ emissions problem due to catalyst regeneration.

In an FCC process, catalyst particles (inventory) are repeatedly circulated between a catalytic cracking zone and a catalyst regeneration zone. During regeneration, coke which deposits from the cracking reaction onto the catalyst particles is removed at elevated temperatures by oxidation with oxygen containing gases such as air. The removal of coke deposits restores the activity of the catalyst particles to the point where they can be reused in the cracking reaction. The coke removal step is performed over a wide range of oxygen availability conditions. At the minimum, there is typically at least enough oxygen to convert all the coke made to CO and $H_2O$. At the maximum, the amount of oxygen available is equal to or greater than the amount necessary to oxidize all the coke to $CO_2$ and $H_2O$.

In an FCC unit operating with sufficient air to convert essentially all of the coke on the catalyst to $CO_2$ and $H_2O$, the gas effluent exiting the regenerator will contain "excess oxygen" (typically 0.5 to 4% of total off gas). This combustion mode of operation is usually called "complete" or "full burn". When the fluid catalytic cracking unit (FCCU) regenerator is operating in full burn mode, the conditions in the regenerator are for the most part oxidizing. That is, there is at least enough oxygen to convert (burn) all reducing gas phase species (e.g., CO, ammonia, HCN, $H_2S$ and COS) regardless of whether this actually happens during the residence time of these species in the regenerator. Under these conditions, essentially all of the nitrogen deposited with coke on the catalyst during the cracking process in the FCCU riser is eventually converted to molecular nitrogen or $NO_x$ and exits the regenerator as such with the off gas.

Simultaneously with $NO_x$ emissions problems, afterburn and emissions of CO may also be a concern for full burn units. Gases exiting the catalyst bed of an FCCU operating in a full burn combustion mode will consist mainly of $CO_2$, $H_2O$, $O_2$ (typically called excess oxygen), and minor amounts of CO, NO, $SO_2$, and potentially some reduced nitrogen species. However, depending on the design and mechanical condition of the regenerator, conditions can develop in which sufficient amounts of CO and $O_2$ escape the catalyst allowing the CO to react with the available $O_2$. The reaction can occur in the regenerator at any point above the dense catalyst bed, including the area above the dense bed (dilute phase), the cyclones where entrained catalyst is separated from the flue gas, the plenum above the cyclones, or even the flue gas pipe.

This phenomenon, generally referred to as "afterburn", is common in full burn regenerators because by the very nature of this mode of operation there is excess $O_2$ in the regenerator available to "light up" CO escaping the dense bed. Because afterburn occurs after the dense bed of the cracking catalyst which acts as a heat sink absorbing the heat released from the exothermic reaction of CO with $O_2$, it can heat up the gases to the point that overheating can occur. The result can be temperatures which approach the metallurgical limit of the materials used to construct the regenerator. High afterburn can limit the useful life of the regenerator equipment, and runaway afterburn can cause catastrophic equipment failure.

Further, unlike units operating in partial burn, or even in incomplete combustion mode, which typically have a CO boiler, full burn units do not generally have a fired boiler on the regenerator flue gas train. As a result, any CO escaping the regenerator will be emitted to the atmosphere. In many FCCUs operating in full burn combustion mode, CO combustion promoters are used to minimize the emission of CO from the regenerator by promoting the combustion of CO to $CO_2$. While many CO combustion promoter formulations have been used, conventional CO combustion promoters typically comprise an additive comprised of 300 to 1000 ppm platinum or alumina, or much smaller amounts of platinum, e.g. amounts which typically achieve from about 0.1 to about 10 ppm in the total cracking catalyst inventory, are incorporated directly into the cracking catalyst itself. Unfortunately, however, such CO combustion promoter additives or formulations typically cause a dramatic increase (e.g. 300%) in $NO_x$ emissions from the regenerator.

Consequently, recent approaches for controlling industrial emissions from an FCCU have attempted to reduce the level of $NO_x$ emissions while simultaneously promoting CO combustion during an FCC catalyst regeneration step. For example, U.S. Pat. Nos. 6,165,933 and 6,358,881 disclose the use of a $NO_x$ reduction composition, which promotes CO combustion during an FCC catalyst regeneration process step while simultaneously reducing the level of $NO_x$ emitted during the regeneration step. $NO_x$ compositions disclosed by these patents may be used as an additive, which is circulated along with the FCC catalyst inventory or incorporated as an integral part of the FCC catalyst.

In U.S. Pat. No. 4,290,878, $NO_x$ is controlled in the presence of a platinum-promoted CO oxidative promoter in a full burn combustion regenerator. This patent requires the addition of iridium or rhodium on the combustion promoter in amounts lesser than the amount of platinum presence in the CO oxidative promoter.

U.S. Pat. No. 4,973,399 discloses the use of copper-loaded zeolite additives for reducing emissions of $NO_x$ from the regenerator of an FCCU unit operating in full CO-burning mode.

However, there still remains a need in the refining industry for improved FCC processes which minimize the content of $NO_x$ emitted from an FCC regenerator operating in a full burn or complete burn mode and simultaneously promote the combustion of CO.

SUMMARY OF THE INVENTION

A catalytic cracking process has been developed which reduces the content of $NO_x$ emissions released from the flue gas exiting an FCCU regeneration zone operating in a complete or full burn combustion mode. Advantageously, the processes of the present invention are capable of avoiding significant $NO_x$ formation while simultaneously promoting CO combustion during a catalytic cracking process.

Catalytic cracking processes of the invention employ a $NO_x$ reduction component comprising (i) an acidic metal oxide support; (ii) an alkali metal, an alkaline earth metal and mixtures thereof, measured as the oxide; (iii) an oxygen storage component; (iv) palladium and (v) at least one noble metal component selected from the group consisting of platinum, rhodium, iridium, osmium, ruthenium, rhenium and mixtures thereof. Catalytic cracking processes of the invention encompass the use of the $NO_x$ reduction compositions either as an integral part of the cracking catalyst particles or as a separate admixture of the particles in the catalyst inventory.

In a preferred embodiment of the invention, the process is a fluid catalytic cracking (FCC) process wherein the fluid catalytic cracking unit (FCCU) regenerator is operated in a full burn or complete combustion mode.

Accordingly, it is an advantage of this invention to provide a process for reducing the emissions of $NO_x$ during a catalytic cracking process.

It is also an advantage of this invention to provide a process for reducing the emissions of $NO_x$ released during an FCC process.

Another advantage of this invention is to provide a process for reducing the content of $NO_x$ released from the regenerator of a FCCU operating in a full burn or complete combustion mode.

It is yet another advantage of this invention to provide a process for reducing the content of $NO_x$ released from a full burn or complete burn FCCU regenerator while simultaneously promoting the combustion of CO.

Another advantage of the invention is to provide improved full burn or complete combustion FCC processes.

These and other advantages of the present invention are described in further detail below.

DETAILED DESCRIPTION OF THE INVENTION

For purposes of this invention the term "$NO_x$" is used herein to indicate oxides of nitrogen, e.g. nitric oxide, (NO) and nitrogen dioxide ($NO_2$) the principal noxious oxides of nitrogen, as well as $N_2O_4$, $N_2O_5$ and mixtures thereof.

For purposes of this invention the term "afterburn" is used herein to indicate the burning of CO which occurs when CO and $O_2$ escaping the dense bed of fluidized cracking catalyst being regenerated react at any point above the dense catalyst bed, including the area immediately above the dense bed (dilute phase), the cyclones where entrained catalyst is separated from the flue gas, the plenum, overhead area above the cyclones, or the flue gas pipe. Afterburn is measured as the difference between any of the temperatures measured above the regenerator dense bed or the average of all or any group of temperatures measured above the regenerator dense bed (e.g., dilute phase, cyclone, plenum, overhead, or flue gas temperatures and the like) minus any of the dense bed temperatures or the average of all or any group of dense bed temperatures measured.

The present invention encompasses the discovery that the use of a certain class of compositions is highly effective for the reduction of $NO_x$ emissions released from a FCCU where the FCCU regenerator is operated in a full burn or complete combustion mode. The compositions of the invention are characterized in that they comprise (i) an acidic metal oxide component; (ii) an alkali metal, alkaline earth metal and mixtures thereof; (iii) an oxygen storage component; (iv) palladium and (v) at least one noble metal component selected from the group consisting of platinum, rhodium, iridium, osmium, ruthenium, rhenium and mixtures thereof.

The acidic metal oxide useful in the compositions of the invention is any metal oxide component having sufficient acidity to adsorb a base, e.g. pyridine, and the like. In accordance with the present invention, the acidic metal oxide contains no or substantially no, i.e. less than 5 wt %, zeolite. Typically, the acidic metal oxide contains at least some alumina. Preferably, the acidic metal oxide contains at least 1 wt % alumina; more preferably, at least 25 wt % alumina; most preferably, at least 50 wt % alumina. It is also within the scope of the invention that the acidic metal oxide may contain other stabilizing metal oxides, such as for example, lanthana, zirconia, yttria, neodymia, samaria, europia, gadolinia and the like. In a preferred embodiment of the invention, the acidic metal oxide is selected from the group consisting of alumina, silica alumina, lanthana alumina and zirconia alumina.

The acidic metal oxide may be crystalline or amorphous. Amorphous silica aluminas are most preferred. Where an amorphous alumina silica is used, it will have a preferred alumina to silica molar ratio of about 0.6 to 60:1, more preferably 1 to 50:1, and even more preferably about 2 to 20:1.

The amount of the acidic metal oxide component present in the composition of the invention will typically be at least 5 wt % of the total composition. Preferably, the amount of the acidic metal oxide component ranges from about 5 to about 98 wt %, more preferable from about 15 to about 95 wt % and even more preferable, from about 20 to about 90 wt % of the total composition.

Further, the acidic metal oxide has a sufficient surface area to promote the reduction of $NO_x$ and gas phase reduced nitrogen species formed in the flue gas of an FCCU regenerator operated in a partial or incomplete combustion mode. Typically, the acidic metal oxide has a BET surface area of at least 5 $m^2/g$. Preferably, the acidic metal oxide has a BET surface area of at 5 to 500 $m^2/g$, more preferably about 50 to 250 $m^2/g$.

Alkali metals useful to prepare the compositions of the invention include, but are not limited to, sodium, potassium, cesium, lithium and the like. Preferably, the alkali metal component is sodium, potassium or a mixture thereof. The amount of alkali metal present in the composition of the invention is typically at least 0.5 wt % (on a metal oxide basis). Preferably, the amount of alkali metal in the composition ranges from about 1 to about 20 wt %, most preferably, from about 1 to about 10 wt % (on a metal oxide basis) of the total composition.

Alkaline earth metals useful to prepare compositions in accordance with the present invention include, but are not limited to, magnesium, calcium, barium, strontium and the like. Preferably, the alkaline earth metal is magnesium. The amount of alkaline earth metal present in the composition of the invention is at least 0.5 wt % (on a metal oxide basis). Preferably, the amount of the alkaline earth metal ranges from about 0.5 to 60 wt %, most preferably 5 to 40 wt %, (on a metal oxide basis) of the invention composition. It is within the scope of the invention to use the alkali and alkaline earth metals alone or in combination.

The oxygen storage component may be any metal oxide having oxygen storage capability. In a preferred embodiment of the invention, the oxygen storage component is a rare earth metal oxide or a transition metal oxide having oxygen storage capability. Suitable rare earth metal oxides include, but are not limited to, ceria, samaria, praseodymia, europia, terbia and mixtures thereof. Suitable transition metals include vanadia, manganese oxide, iron oxide, nickel oxide, copper oxide, cobalt oxide, chromia, titania, silver oxide, molybdenia, niobia, gold oxide, tungsten oxide, and mixtures thereof. In a most preferred embodiment of the invention at least a portion of the oxygen storage component is ceria. In this embodiment, the amount of ceria present in the oxygen storage component is at least 1 wt %, preferably at least 10 wt % and most preferred at least 30 wt % of the oxygen storage component. In an even more preferred embodiment, the oxygen storage metal oxide component consists essentially of ceria.

It is also within the scope of the present invention that the oxygen storage metal oxide component may contain other stabilizing metal oxides such as, for example, zirconia and rare earth metal oxides typically not heretofore known in the art to have oxygen storage capability, e.g., lanthana, neodymia, gadolinia, yttria, scandia, hafnia, and mixtures thereof.

The oxygen storage metal oxide component is preferably present as a micro dispersed phase as opposed to large bulk oxide particles or ions located at exchange sites in the oxide support. The amount of the oxygen storage metal oxide present in the compositions of the invention may vary considerably relative to the amount of acidic metal oxide. Generally, the oxygen storage component is present in the amount of at least 0.1 wt %; preferably from about 1 to 50 wt %; most preferably from about 5 to about 30 wt %, of the total composition.

The amount of palladium useful in the present invention, calculated as the metal, is at least 0.1 parts per million, preferably at least 20 parts per million, most preferably at least 40 parts per million. In a preferred embodiment of the invention, the amount of palladium ranges from about 0.1 to about 5000 parts per million, preferably from about 20 to about 2500 parts per million, most preferably from about 40 to about 1500 parts per million.

In general, the noble metal component is any metal of the noble group metals including but not limited to, platinum, iridium, rhodium, osmium, ruthenium, rhenium, and mixtures thereof. Preferably, the noble metal component is selected from the group consisting of platinum, rhodium, iridium and mixtures thereof. Typically, the amount of the noble metal component useful in the present invention, calculated as the metal, is at least 0.1 parts per million, preferably at least 10 parts per million, most preferably at least 25 parts per million. In a preferred embodiment of the invention, the amount of the noble metal component ranges from about 0.1 to 5,000 parts per million, preferably from about 10 to 2500 parts per million, most preferably from about 25 to about 1500 parts per million.

Additional materials optionally present in the compositions useful in the present invention include, but are not limited to, fillers, binders, etc., provided that said materials do not significantly adversely affect the performance of the compositions to reduce the content of $NO_x$ or promote CO combustion under full or complete combustion conditions. It is preferred, however, that the compositions of the invention consist essentially of components (i) through (v).

The invention process involves circulating an inventory of cracking catalyst and the $NO_x$ reduction composition in a catalytic cracking process, which presently is almost invariably the FCC process. For convenience, the invention will be described with reference to the FCC process although the present cracking process could be used in the older moving bed type (TCC) cracking process with appropriate adjustments in particle size to suit the requirements of the process. Apart from the addition of the oxidative catalyst/additive composition to the catalyst inventory and some possible changes in the product recovery section, the manner of operating the process will remain unchanged. Thus, conventional FCC catalysts may be used, for example, zeolite based catalysts with a faujasite cracking component as described in the seminal review by Venuto and Habib, *Fluid Catalytic Cracking with Zeolite Catalyst*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type acidic zeolitic active component, one or more matrix aluminas and/or silica aluminas, and fillers such as kaolin clay. The Y zeolite may be present in one or more forms and may have been ultra-stabilized and/or treated with stabilizing cations such as any of the rare earths.

Somewhat briefly, the fluid catalytic cracking process in which a heavy hydrocarbon feedstock will be cracked to lighter products takes place by contact of the feed in a cyclic catalyst recirculation cracking process with a circulating fluidizable catalytic cracking catalyst inventory consisting of particles having a mean particle size of from about 50 to about 150 μm, preferably about 60 to about 100 μm. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

Suitable feedstocks include petroleum distillates or residuals of crude oils which, when catalytically cracked, provide either a gasoline or a gas oil product. Synthetic feeds having boiling points of about 204° C. to about 816° C., such as oil from coal, tar sands or shale oil, can also be included.

Cracking conditions employed during the conversion of higher molecular weight hydrocarbons to lower molecular weight hydrocarbons include a temperature of 480° C. to about 600° C. A catalyst to hydrocarbon weight ratio of about 1 to 100, preferably about 3 to 20 is contemplated for the hydrocarbons conversion. The average amount of coke deposited on the surface of the catalyst is between 0.5 weight percent and 3.0 weight percent depending on the quality of the feed, the catalyst used, and the unit design and operation. Rapid disengagement of the hydrocarbons from the catalyst is accomplished in a quick-stripping zone either intrinsic within the reactor or located in an external vessel. The stripping function is performed in the presence of steam or another inert gas at a temperature of about 480° C. to about 600° C.

The catalyst regeneration zone of the FCC process includes a lower dense bed of catalyst having a temperature of about 600° C. to about 800° C. and a surmounted dilute phase of catalyst having a temperature of from 600° C. to about 800° C. As it is well known in the art, the catalyst regeneration zone may consist of a single or multiple reactor vessels. In order to remove coke from the catalyst, oxygen is added to the regeneration zone. This is performed by conventional means, such as for example, using a suitable sparging device in the bottom of the regeneration zone or, if desired, additional oxygen is added to other sections of the dense bed or the dilute phase of the regeneration zone.

In the present invention it is preferable to provide an excess quantity of oxygen to operate the regeneration zone in a full burn or complete combustion mode. For the purposes of this invention, the regeneration zone is operated in a full burn or complete combustion mode, when any one of the following conditions is satisfied: (1) there is sufficient air or oxygen added to the regenerator to convert all the carbon in the coke on the spent cracking catalyst to $CO_2$ or (2) the effluent from the regenerator contains enough oxygen to convert all CO in the regenerator effluent to $CO_2$.

$NO_x$ reduction compositions useful in the process of the invention will typically be in the form of particles and will have a particle size sufficient to permit the compositions to be circulated throughout the catalytic cracking unit simultaneously with the cracking catalyst. Typically the particles will have a mean particle size of greater than 45 μm. Preferably, the mean particle size is from about 50 to 200 μm, most preferably about 55 to 150 μm, and even more preferred about 60 to 120 μm. The particles have a surface area of at least 5 $m^2/g$, preferably at least 10 $m^2/g$, most preferably at least 30 $m^2/g$, and a Davison Attrition Index (DI) of 50 or less, preferably 20 or less, most preferably, 15 or less.

The $NO_x$ reduction compositions may be used as separate catalyst/additive particles along with the cracking catalyst or may be incorporated into the cracking catalyst as a component of the catalyst. In a preferred embodiment of the invention, the $NO_x$ reduction catalyst/additives are used as separate particles along with the cracking catalyst inventory to permit optimal conversion of a hydrocarbon feed while minimizing $NO_x$ emissions released from the FCCU regenerator.

When used as a separate additive, the $NO_x$ reduction compositions are used in any amount sufficient to reduce the content of $NO_x$ present in the FCCU regenerator relative to the amount of $NO_x$ present without the use of the catalyst/additives, as measured by conventional gas analysis methodology, including but not limited to, chemiluminescence, UV spectroscopy and IR spectroscopy, and the like. Since the $NO_x$ reduction compositions of the invention have activity to promote CO oxidation, the compositions are preferably used in an amount necessary to prevent afterburning in the catalytic cracking unit. Typically the compositions are used in an amount of at least 0.01 wt % of the cracking catalyst. Preferably, the compositions are used in an amount ranging from about 0.01 to about 50 wt %, most preferably from about 0.1 to about 20 wt % of the cracking catalyst inventory. Separate particles of the $NO_x$ reduction compositions may be added in the conventional manner, e.g. with make-up catalyst to the regenerator or by any other convenient method.

When the $NO_x$ reduction composition is incorporated into or onto the cracking catalyst as a separate component thereof, the composition will typically be used in an amount of at least 0.01 weight percent of the cracking catalyst. Preferably, $NO_x$ reduction composition will be used in an amount ranging from about 0.01 to 50 weight percent of the cracking catalyst; most preferably from about 0.1 to about 20 weight percent of the cracking catalyst.

Other catalytically active components may be present in the circulating inventory of catalytic material in addition to the cracking catalyst and the $NO_x$ reduction catalyst/additive. Examples of such other materials include the octane enhancing catalysts based on zeolite ZSM-5, conventional CO combustion promoters based on a supported noble metal such as platinum on alumina, stack gas desulfurization additives such as DESOX® (magnesium aluminum spinel), vanadium traps and bottom cracking additives, such as those described in Sadeghbeigi, op cit and Scherzer, *Octane Enhancing Zeolitic FCC Catalysts*, Marcel Dekker, New York, 1990, ISBN 0-8247-8399-9. These other components may be used in their conventional amounts.

The effect of the present process is to minimize the content of $NO_x$ emissions from an FCC process operating in a full burn or complete burn mode. Very significant reduction in $NO_x$ emissions may be achieved by the use of the present process, in some cases up to about 90%. $NO_x$ reduction of 10 to 90% is readily achievable with the process according to the invention, as shown by the Examples below. However, as will be understood by the one skilled in the catalyst art, the extent of $NO_x$ reduction will depend on such factors as, e.g., the composition and amount of the additive utilized; the design and the manner in which the FCCU is operated, including but not limited to oxygen level and distribution of air in the regenerator, catalyst bed depth in the regenerator, stripper operation and regenerator temperature; the properties of the hydrocarbon feedstock cracked; and the presence of other catalytic additives that may affect the chemistry and operation of the regenerator. Thus, since each FCCU is different in some or all of these respects, the effectiveness of the process of the invention may be expected to vary from unit to unit.

It is further expected that CO combustion will be advantageously enhanced during the full burn FCC process of the invention simultaneously with the reduction of the level of $NO_x$ and the minimization of afterburn.

The scope of the invention is not in any way intended to be limited by the examples set forth below. The examples include the preparation of $NO_x$ reduction catalyst/additives useful in the process of the invention and the evaluation of the invention process to reduce $NO_x$ and promote CO combustion in a catalytic cracking environment.

To further illustrate the present invention and the advantages thereof, the following specific examples are given. The examples are given as specific illustrations of the invention. It should be understood, however, that the invention is not limited to the specific details set forth in the examples.

All parts and percentages in the examples as well as the remainder of the specification referring to solid material composition or concentration are by weight unless otherwise specified. However, all parts and percentages in the examples as well as the remainder of the specification referring to gas composition are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

The efficiency of the compositions of the invention to reduce $NO_x$ from an FCCU regenerator operating in a full burn mode was evaluated in the Examples using a Regenerator Test Unit (RTU) and model reactions. The RTU is an apparatus specifically designed to simulate the operation of a FCCU regenerator. This apparatus is described in detail in G. Yaluris and A. W. Peters "Studying the Chemistry of the FCCU Regenerator Under Realistic Conditions," Designing Transportation Fuels for a Cleaner Environment, J. G. Reynolds and M. R. Khan, eds., p. 151, Taylor & Francis, 1999, ISBN: 1-56032-813-4, which description is herein incorporated by reference.

The ability of compositions of the invention to convert $NO_x$ in a FCCU regenerator operated in a full burn mode was determined in the RTU by measuring the activity of the composition to catalyze the reaction of $NO_x$ with CO under various $O_2$ levels. The key performance measurement in this test is the $NO_x$ conversion. It is desirable to have high $NO_x$ conversion to nitrogen for a wide range of $O_2$ amounts.

In a regenerator operating in full burn there may be areas where reduced species other than CO (e.g., $NH_3$, HCN, hydrocarbons) can be present for a sufficient time to react with $NO_x$ after it is formed. The ability of compositions of the invention to catalyze such reactions was determined by measuring in the RTU the activity of the compositions for reacting $NH_3$ with $NO_x$ under various $O_2$ levels, simulating the oxidizing/reducing conditions possible in a regenerator operating in full burn. It is desirable in this experiment to have high $NO_x$ conversion to nitrogen.

Example 1

A microspheriodal particulate support material was prepared as a base material for the preparation of the $NO_x$ composition of the invention using the following procedure. A slurry was prepared from an aqueous slurry having 20% solids of a peptizable alumina (Versal 700 alumina powder obtained from La Roche Industries Inc., purity 99% $Al_2O_3$, 30% moisture). The alumina slurry was prepared using 31.6 lbs of the alumina. To the alumina slurry 3.87 lbs of an aqueous sodium hydroxide solution (50% NaOH) was added. Next, 10.4 lbs of cerium carbonate crystals (obtained from Rhone Poulene, Inc., 96% $CeO_2$, 4% $La_2O_3$, 50% volatiles) was added to the slurry. The slurry was diluted with a sufficient amount of water to bring the solids concentration of the slurry to 12%. Finally, 3.38 lbs of exchanged silica sol of Nalco 1140 (obtained from Nalco Chemicals Co., 40% solids) was added to the slurry. The mixture was agitated to assure good mixing and then milled in a stirred media mill to reduce agglomerates to substantially less than 10 microns. The milled slurry was fed to a 10 ft diameter Bowen Engineering spray drier to form approximately 70 micron microspheres. The spray drier was fitted with a rotary atomizer and operated at 315° C. inlet air temperature and 138° C. outlet air temperature. The rotational speed of the atomizer was adjusted until ~50% of the product microspheres were retained on a No. 200 screen. Thereafter the spray dried product was calcined at approximately 650° C. to remove volatiles and provide a final support.

Example 2

Additive A was prepared as follows: A Pd containing solution was prepared by dissolving in 45 lbs of water 549 g of a Pd(II) nitrate solution obtained from Johnson-Mathey which contained 8.643% Pd. A support was prepared as described in Example 1, with the exception that the inputs were adjusted to yield a final product having the composition as shown in Table 1 below. One hundred pounds of the support was then placed in an Eirich mixer. With the Eirich mixer in operation, the Pd containing solution was sprayed on the support. The impregnated material was then discharged from the Eirich mixer and flash dried in a Bowen Engineering flash drier with the inlet temperature set at 538° C., and the outlet set at 149° C. The final product has the properties shown in Table 1 below.

Example 3

Additive B was prepared following the procedure in Examples 1 and 2, except that inputs were adjusted to make a final product having the composition shown in Table 1 below.

Example 4

Additive C was prepared by placing 80.0 g of Additive B as prepared in Example 3 in an inclined beaker on a mechanical rotator. A master Rh solution was prepared by diluting 1.0098 g 10% Rh from nitrate salt with 77.48 g DI water. A further dilution was prepared by removing 5.83 g of the previously made master dilution and adding DI water to 60 g total weight. Additive B was then impregnated by gradually spraying on it 60 g of the latter dilute Rh solution through an air mist spray nozzle system. The wet impregnated material was dried in an oven at 120° C. over night. The dried cake was in the form of large chucks and was first ground in a blender and screened before calcining at 650° C. for two hours to decompose the nitrates and remove volatiles. The composition of the final product is shown in Table 1 below.

TABLE 1

Properties of Additives A, B and C.

|  |  | Additive A | Additive B | Additive C |
|---|---|---|---|---|
| TV @ 955° C. | wt. % | 6.6 | 9.5 | 8.2 |
| $SiO_2$ | wt. % | 4.72 | 7.22 | 7.15 |
| $Al_2O_3$ | wt. % | 69.7 | 63.0 | 63.7 |
| $La_2O_3$ | wt. % | 0.93 | 0.63 | 0.64 |
| $CeO_2$ | wt. % | 21.8 | 21.3 | 22.0 |
| $Na_2O$ | wt. % | 5.64 | 7.9 | 7.87 |
| Pd | ppm | 970 | 990 | 1004 |
| Rh | ppm |  |  | 104 |
| SA | $m^2/g$ | 160 | 104 | 96 |

Example 5

Figure 1:
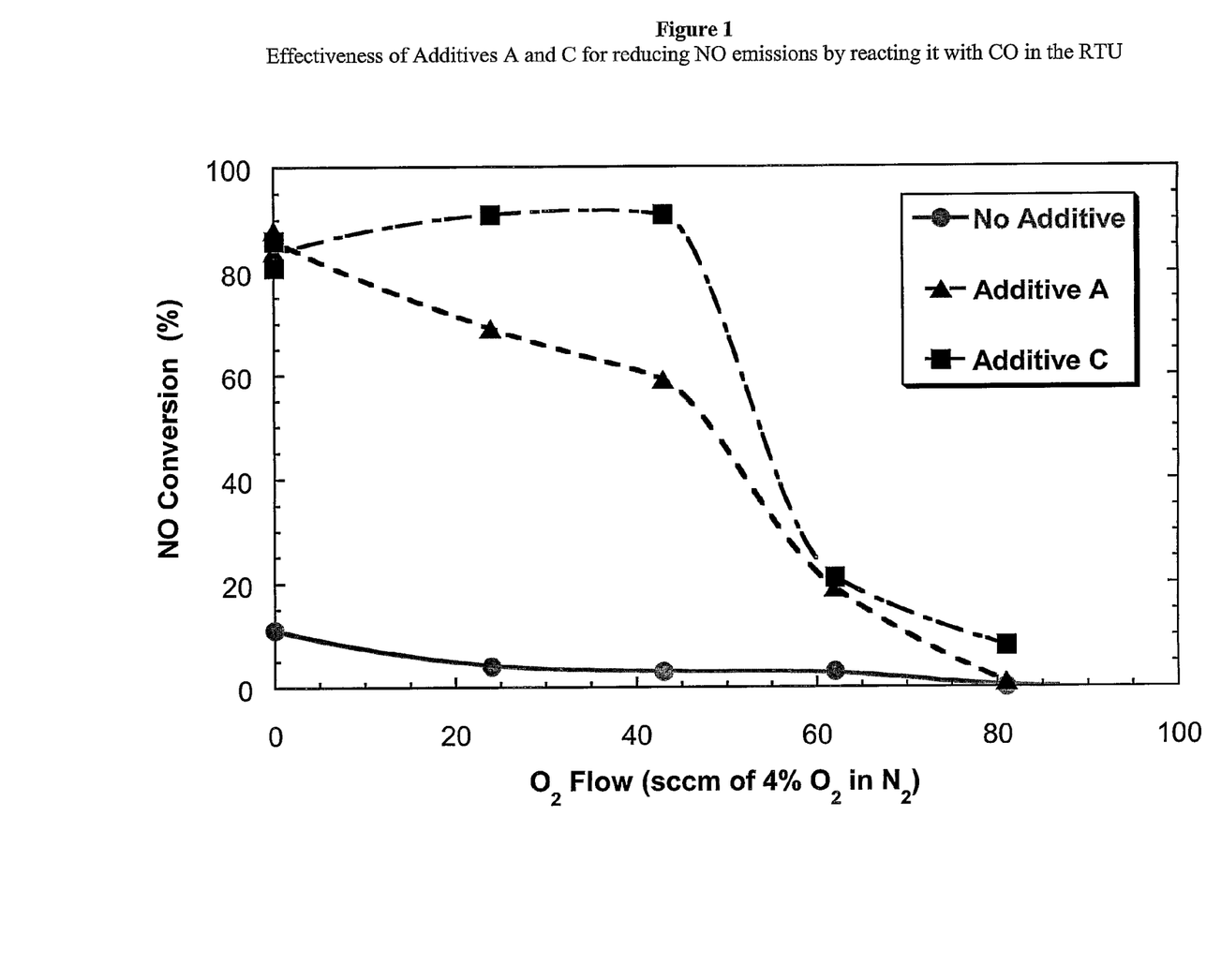
FIG. 1 is a graphic representation of the comparison of NO conversion in an RTU where NO reacts with CO at various levels of $O_2$ in a reactor feed in the presence of a catalytic cracking catalyst alone or in combination with Additive A or Additive C.

The activity of Additives A and C for reducing NO emissions from the FCCU regenerator was assessed by measuring the activity for catalyzing the NO reduction by CO in the RTU. After calcination for 2 h at 593° C., the additives were blended at 0.5% level with FCC catalyst, OCTACAT®-DCH obtained from Grace Davison, which had been deactivated for 4 h at 816° C. in a fluidized bed reactor with 100% steam. The cracking catalyst alone or the blend was then fed to the RTU reactor operating at 700° C. The gas feed to the reactor was a mixture containing 5000-5500 ppm CO, 500-550 ppm NO, various amounts of oxygen added as 4% $O_2/N_2$, and the balance nitrogen. The total gas feed rate excluding the $O_2$ containing gas feed was 1000-1100 sccm. The amount of oxygen during this experiment was varied so that the conditions in the RTU reactor would simulate reducing and oxidizing areas of an FCCU regenerator. The results are shown in FIG. 1. The data showed that the Pd/Rh containing Additive C is much more effective in reducing NO than Additive A.

Example 6

Figure 2:
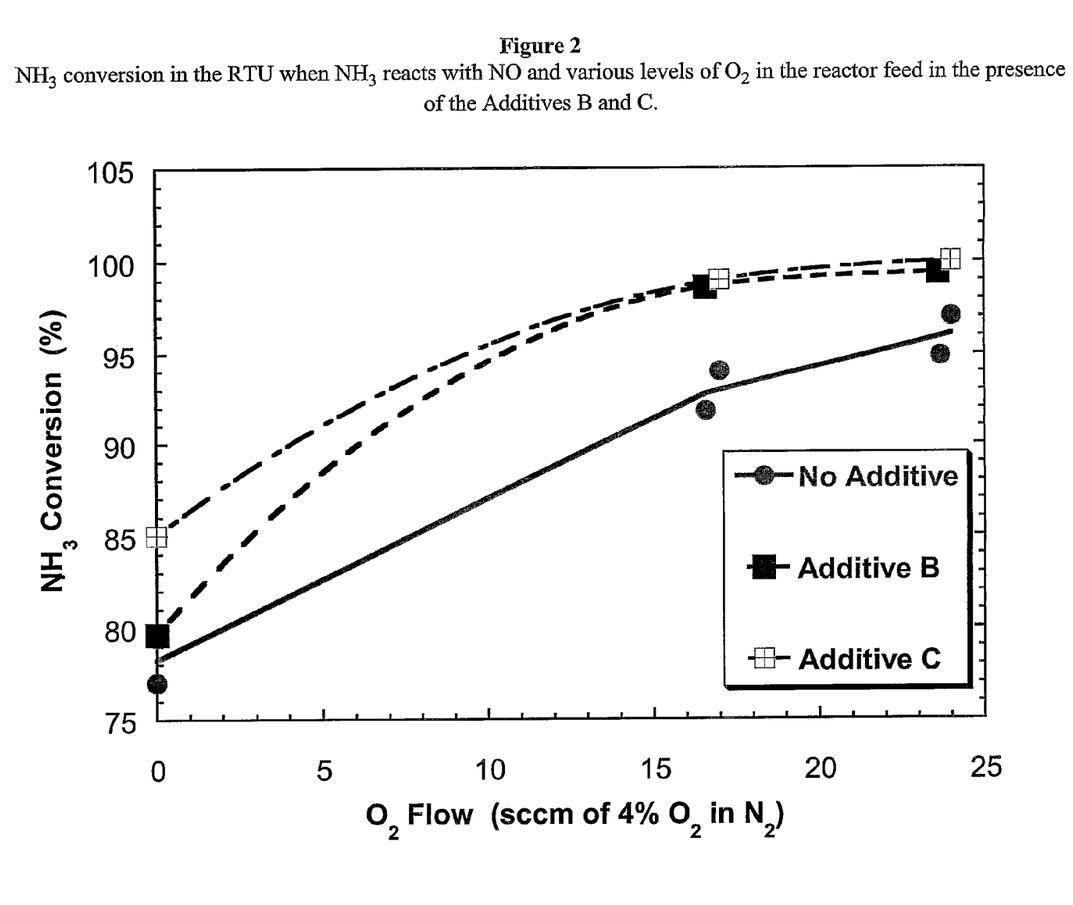
FIG. 2 is a graphic representation of the comparison of $NH_3$ conversion in an RTU where $NH_3$ reacts with NO at various levels of $O_2$ in the reactor feed in the presence of a catalytic cracking catalyst alone or in combination with Additive B or Additive C.
Figure 3:
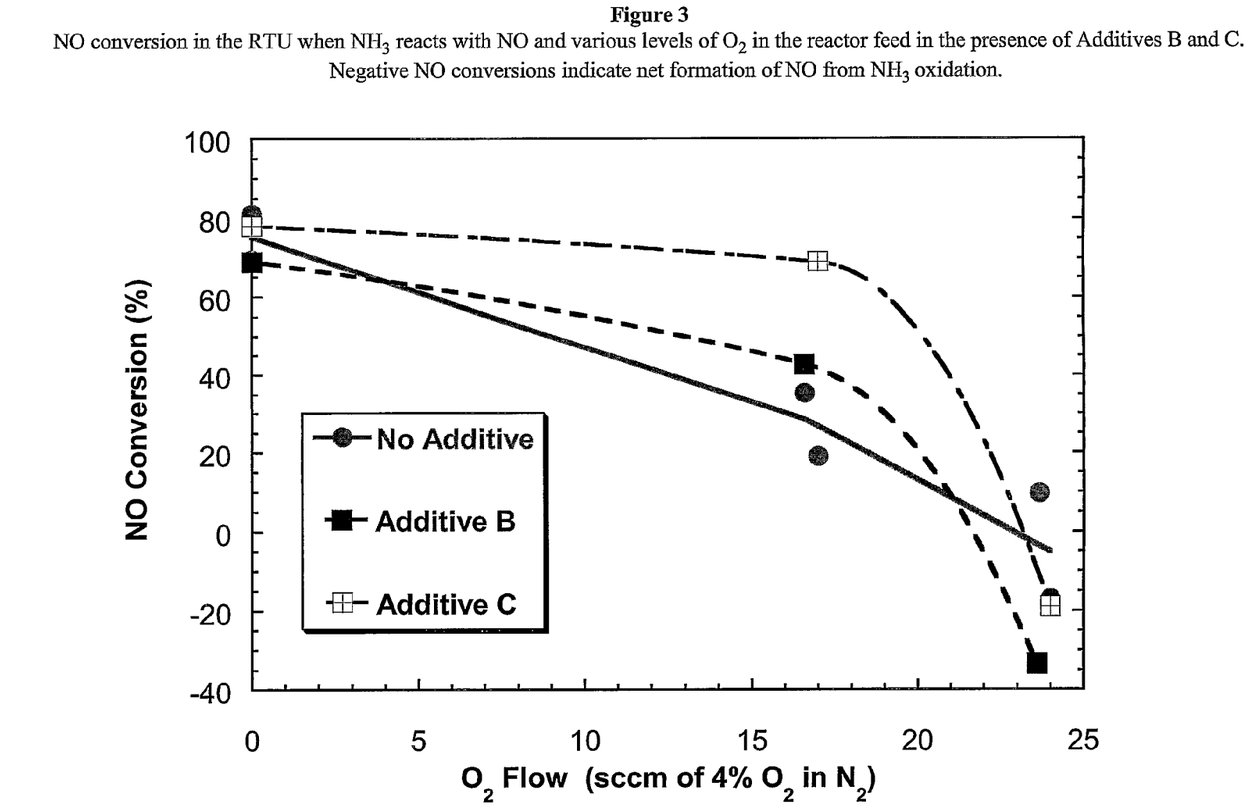
FIG. 3 is a graphic representation of the comparison of NO conversion in an RTU where $NH_3$ reacts with NO at various levels of $O_2$ in the reactor feed in the presence of a catalytic cracking catalyst alone or in combination with Additive B or Additive C.

The activity of Additive B and Additive C for reducing NO emissions from the FCCU regenerator was assessed by reacting NO with $NH_3$. The experiment was conducted as in Example 5 except that the gas mixture fed to the reactor contained approximately 1000 ppm $NH_3$ and 500-550 ppm NO as well as various amounts of oxygen with the balance nitrogen. At the high temperatures of this experiment $NH_3$ reacts with $O_2$ to form $N_2$ or NO. To the extent that $NH_3$ survives it can also react in the gas phase with NO in a non-catalytic process that is often used for NO abatement. Thus, it is not surprising that the data in FIGS. 2 and 3 show the catalyst alone being effective for converting both $NH_3$ and NO unless the $O_2$ levels in the reactor rise. In the latter case some of the $NH_3$ is converted to NO. However, Additives B and C further enhance the conversion of NO with $NH_3$.

Example 7

The CO oxidation activity of Additives A, B and C was assessed in the RTU using cracking catalyst coked in the FCC pilot plant, the Davison Circulating Riser (DCR). The description of the DCR has been published in the following papers: G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52; G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis Volume 76, p. 257, Elsevier Science Publishers B.V., Amsterdam 1993, ISBN 0-444-89037-8. The FCC catalyst, OCTACAT®-DST obtained from Grace Davison, was first deactivated for 4 h at 816° C. in a fluidized bed reactor with 100% steam before being coked by being circulated in the DCR to react with a FCC feed. The properties of the coked catalyst are shown in Table 2 below. The additives were calcined for 2 h at 593° C. and then mixed with the coked cracking catalyst at 0.2% additive level. The coke catalyst or the blend was then fed into the RTU reactor operating at 700 or 710° C. respectively, and the coke was burned with a gas mixture of air and nitrogen so that there was 1.1% excess $O_2$ in the RTU reactor effluent. The CO measured at the reactor effluent is a measure of the CO combustion activity. The lower the CO the higher the combustion activity of the additive. In Table 3 we show the CO emissions measured in the RTU reactor effluent. While the effectiveness for reducing CO emissions may vary, all Additives A, B and C are effective for reducing CO emissions.

TABLE 2

Properties of coked catalyst used in the RTU experiments

| $SiO_2$ | wt. % | 53.4 |
|---|---|---|
| $Al_2O_3$ | wt. % | 43.7 |
| $RE_2O_3$ | wt. % | 0.10 |
| $Na_2O$ | wt. % | 0.33 |
| $SO_4$ | wt. % | 0.56 |
| $Fe_2O_3$ | wt. % | 0.7 |
| $TiO_2$ | wt. % | 1.0 |
| Carcon | wt. % | 1.37 |
| S | wt. % | 0.16 |
| SA | $m^2/g$ | 168 |
| Matrix | $m^2/g$ | 30 |
| Zeolite | $m^2/g$ | 138 |

TABLE 3

CO emissions during coked FCC catalyst regeneration in the RTU with Additives A, B and C blended in with the coked catalyst.

| Additive | Bed Temp (C.) (C.) | CO (nppm) (nppm) |
|---|---|---|
| No Additive (Basecase) | 701 | 3480 |
| Additive A | 698 | 1172 |
| Additive B | 699 | 1890 |
| Additive C | 698 | 1928 |
| No Additive (Basecase) | 711 | 1990 |
| Additive A | 708 | 915 |
| Additive B | 709 | 1477 |
| Additive C | 709 | 1460 |

Example 8

Figure 4:
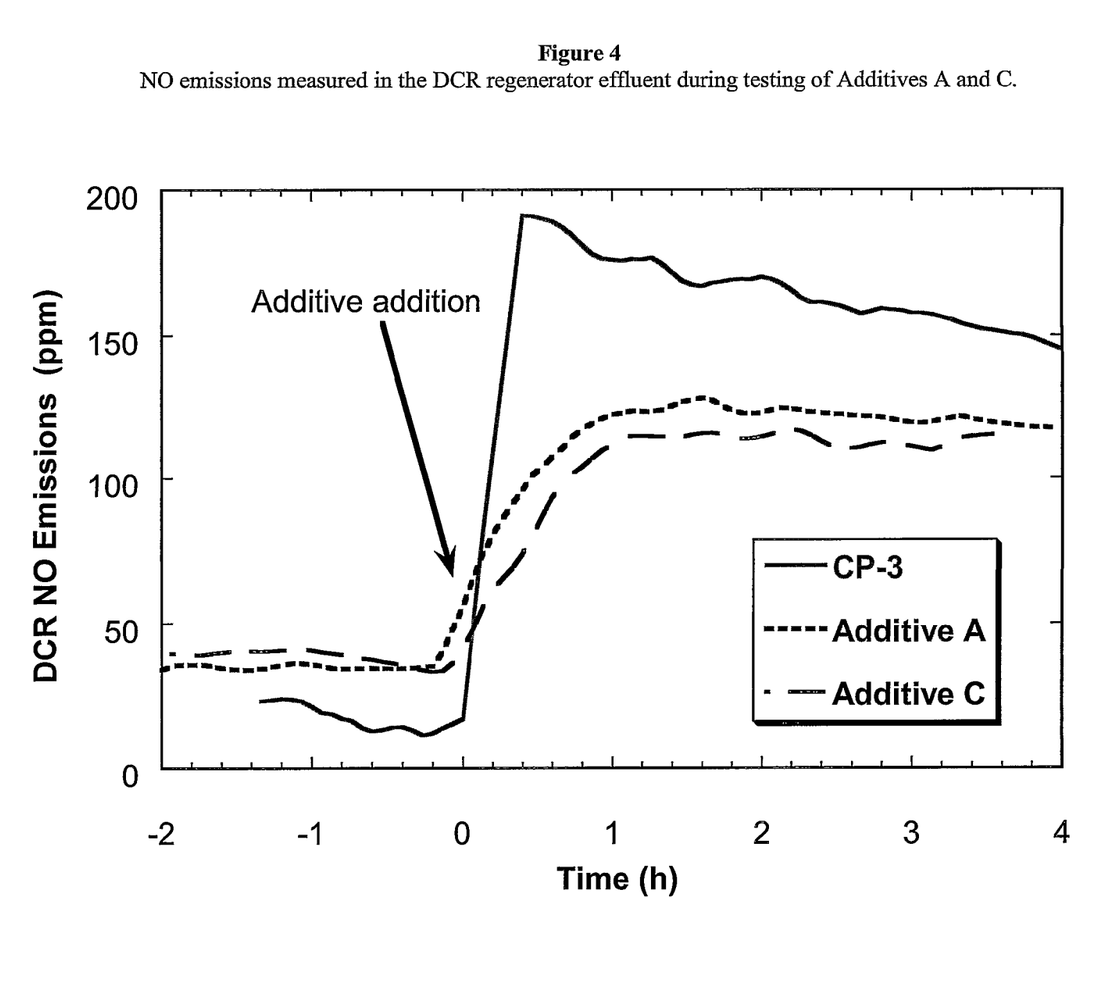
FIG. 4 is a graphic representation of the NO emissions measured in the DCR regenerator effluent for Additives A and C.

The ability of Additives A and C to reduce NO emissions as compared with a conventional CO combustion promoter CP-3® (obtained from Grace Davison) was tested in the DCR. The DCR was started up by charging the unit with approximately 1900 g of equilibrium catalyst, having the properties shown in Table 4. For the purposes of this test, a commercial FCC feed was used having the properties shown in Table 5. The DCR was operated with 1% excess $O_2$ in the regenerator, and with the regenerator operating at 705° C. After the unit stabilized, the baseline $SO_2$ and NO emissions data were collected using an on-line Lear-Siegler $SO_2$/NO Analyser (SM8100A). Subsequently, 100 g of catalyst were injected into the DCR consisting of 10 g of the additive, 5 g of CP-3® combustion promoter and the balance equilibrium catalyst. The results in FIG. 4 show that the use of either Additives A or C resulted in lower NO emissions than using a conventional combustion promoter. However, the combination of Pd with Rh in Additive C resulted in lower NO emissions than those of Additive A which did not contain Rh.

TABLE 4

Properties of equilibrium catalyst used in DCR tests.

| $SiO_2$ | wt. % | 50.9 |
|---|---|---|
| $Al_2O_3$ | wt. % | 45.5 |
| $RE_2O_3$ | wt. % | 0.37 |
| $Na_2O$ | wt. % | 0.37 |
| Fe | wt. % | 0.6 |
| $TiO_2$ | wt. % | 1.2 |
| MgO | wt. % | 0.319 |
| Ni | ppm | 681 |
| V | ppm | 1160 |
| SA | $m^2/g$ | 188 |
| Zeolite | $m^2/g$ | 128 |
| Matrix | $m^2/g$ | 60 |

TABLE 5

Properties of FCC feed used in DCR tests.

| | |
|---|---|
| API Gravity @ 60° F. | 23.2 |
| Sulfur, wt. % | 0.023 |
| Total Nitrogen, wt. % | 0.13 |
| Basic Nitrogen, wt. % | 0.0378 |
| Conradson Carbon, wt. % | 0.03 |
| Fe, ppm | 0.7 |
| Na, ppm | 0.7 |
| K Factor | 11.4 |
| Simulated Distillation, vol. %, oF | |
| 5 | 453 |
| 20 | 576 |
| 40 | 660 |
| 60 | 743 |
| 80 | 838 |
| FBP | 1153 |

What is claimed is:

1. A method of reducing $NO_x$ emissions from the regeneration zone during fluid catalytic cracking of a hydrocarbon feedstock into lower molecular weight components, said method comprising contacting a hydrocarbon feedstock with a cracking catalyst inventory at elevated temperature in a fluid catalytic cracking unit having a regeneration zone operated under a full burn mode or complete mode of combustion under fluid catalytic cracking conditions whereby lower molecular weight hydrocarbon components are formed, said cracking catalyst comprising (a) a fluid catalytic cracking component suitable for catalyzing the cracking of hydrocarbons, and (b) a $NO_x$ reduction component comprising (i) at least about 5.0 wt % of acidic metal oxide containing substantially no zeolite; (ii) at least 0.5 wt %, measured as metal oxide, of a metal component selected from the group consisting of alkali metals, alkaline earth metals, and mixtures thereof (iii) at least 0.1 wt %, measured as metal oxide, of an oxygen storage metal oxide; (iv) at least 0.1 ppm palladium; and (v) at least 0.1 ppm of a noble metal component selected from the group consisting of platinum, iridium, rhodium, osmium, ruthenium, rhenium and mixtures thereof, all percentages being based on the total weight of the $NO_x$ reduction component.

2. The method of claim 1 further comprising recovering the cracking catalyst from said contacting step and treating the used catalyst in a regeneration zone to regenerate said catalyst.

3. The method of claim 1 wherein components (a) and component (b) are fluidized during contacting said hydrocarbon feedstock.

4. The method of claim 1 wherein the method promotes CO combustion simultaneously with reducing $NO_x$ emissions from the regeneration zone of a fluid catalytic cracking unit during a fluid catalytic cracking process.

5. The method of claim 1 wherein the method reduces afterburn in the regeneration zone of a fluid catalytic cracking unit during a fluid catalytic cracking process.

6. The method of claim 1 wherein the $NO_x$ reduction component is a separate particle additive.

7. The method of claim 6 wherein the $NO_x$ reduction component has a mean particle size of about 50 to about 200 μm.

8. The method of claim 1 wherein the $NO_x$ reduction component is an integral component of the cracking catalyst.

9. The method of claim 1 wherein the $NO_x$ reduction component is used in an amount sufficient to prevent afterburning in the catalytic cracking unit.

10. The method of claim 1 wherein the $NO_x$ reduction component is present in an amount of at least 0.01 wt % of the cracking catalyst inventory.

* * * * *